H. W. CONNER.
WINDSHIELD FOR AUTOMOBILES.
APPLICATION FILED AUG. 8, 1918.
1,364,834.
Patented Jan. 4, 1921.
2 SHEETS—SHEET 2.
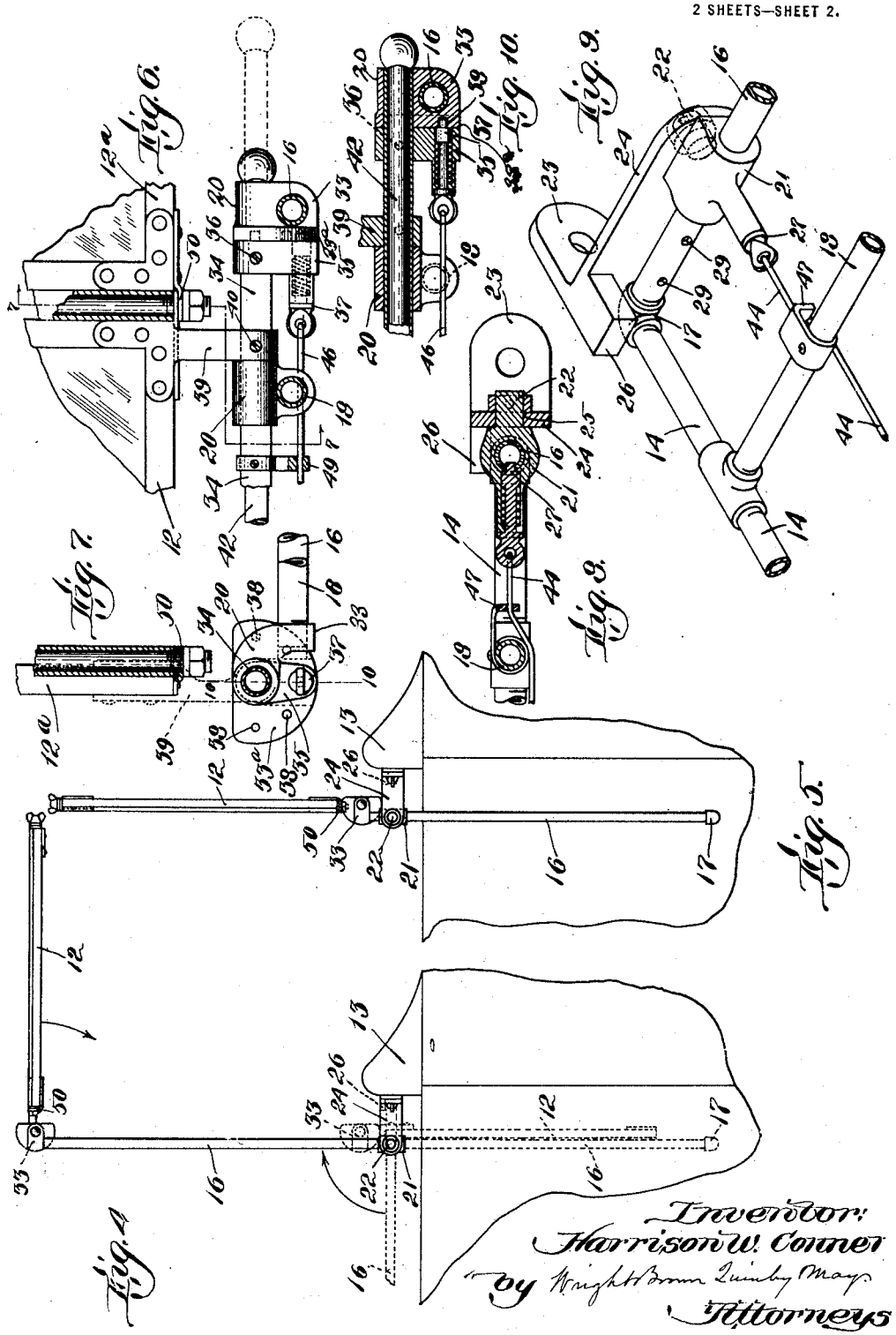
Inventor:
Harrison W. Conner

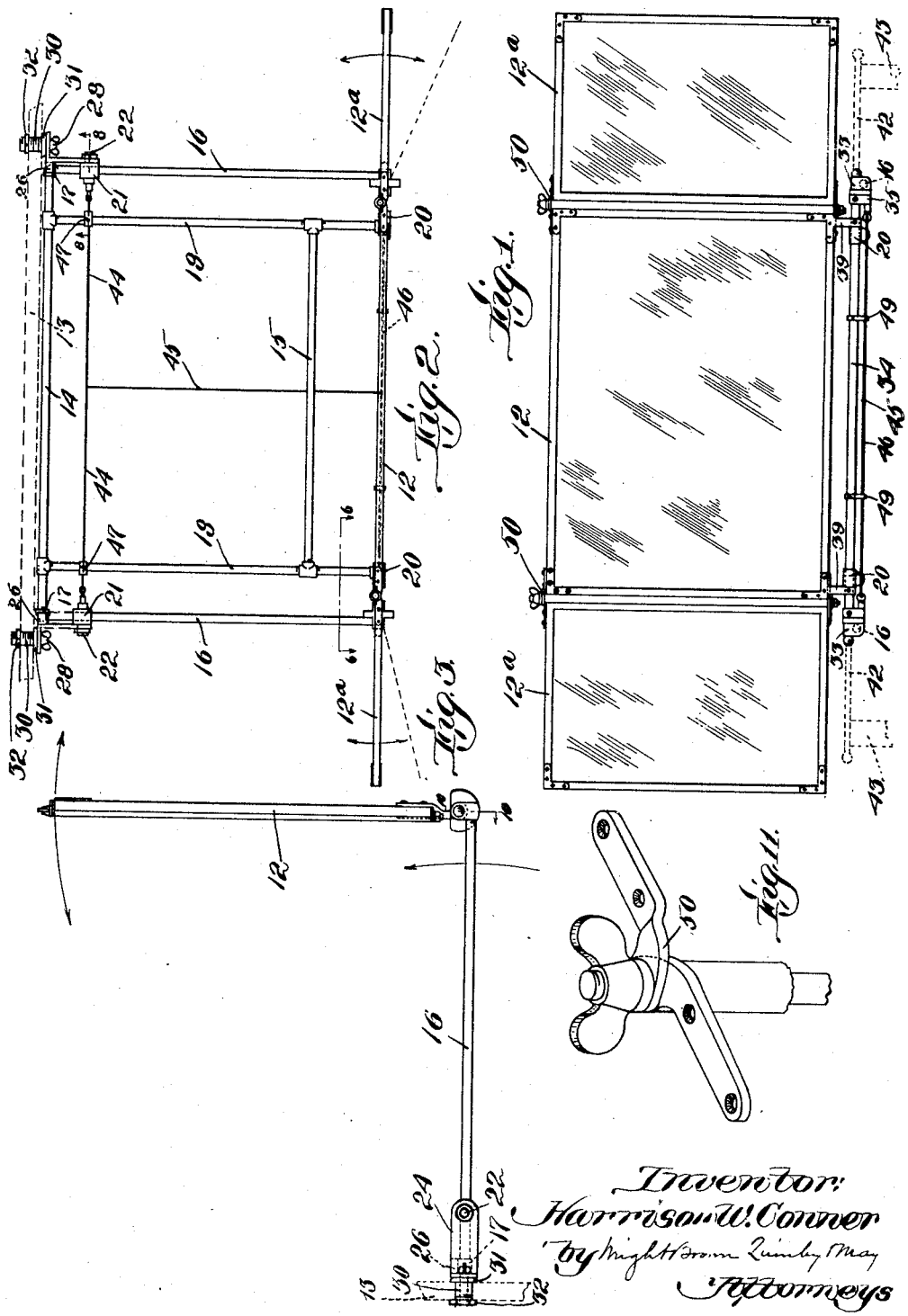

UNITED STATES PATENT OFFICE.

HARRISON W. CONNER, OF BOSTON, MASSACHUSETTS, ASSIGNOR TO TONNEAU SHIELD CO., INC., OF NEW YORK, N. Y., A CORPORATION OF NEW YORK.

WINDSHIELD FOR AUTOMOBILES.

1,364,834.  Specification of Letters Patent.  Patented Jan. 4, 1921.

Application filed August 8, 1918. Serial No. 248,825.

*To all whom it may concern:*

Be it known that I, HARRISON W. CONNER, a citizen of the United States, residing at Boston, in the county of Suffolk and State of Massachusetts, have invented new and useful Improvements in Windshields for Automobiles, of which the following is a specification.

This invention relates to a windshield for automobile bodies, including a screen and means for displaceably connecting the screen with the body. The invention has for its object to provide a windshield comprising a screen and confining means whereby the screen is adapted to be connected with the vehicle body, in such manner that it may occupy various operative positions in front of the rear seat, the screen and confining means being adjustable, so that the screen may be located relatively near the rear seat to shield only the occupants thereof, or may be adjusted forward to shield the occupants of intermediate seats, as in a so-called seven-passenger car, the screen and confining means being further adjustable, so that they may be folded and inoperatively stored behind the front seat.

The invention is embodied in the improvements which I will now proceed to describe and claim.

Of the accompanying drawings forming a part of this specification,—

Figure 1 is a rear elevation of a windshield embodying the invention, the screen being adjusted to shield only the occupants of the rear seat.

Fig. 2 is a top plan view of the same.

Fig. 3 is an end view.

Fig. 4 is an end view showing the windshield in different positions by full and dotted lines.

Fig. 5 is an end view showing the windshield adjusted to protect the occupants of intermediate seats.

Fig. 6 is an enlargement of a portion of Fig. 1.

Fig. 7 is a section on line 7—7 of Fig. 6.

Fig. 8 is a section on line 8—8 of Fig. 2.

Fig. 9 is a fragmentary perspective view hereinafter referred to.

Fig. 10 is a section on line 10—10 of Fig. 7.

Fig. 11 is a perspective view illustrating the hinge connection between the body and one of the wings of the screen shown by Fig. 1.

The same reference characters indicate the same parts in all of the figures.

The windshield includes a screen 12 which may be of any suitable construction, and supporting means therefor herein particularly illustrated as a platform adapted to be hinged to the back 13 of the front seat of the vehicle body. Said platform is rectangular and is formed to occupy a substantially horizontal position over the leg-receiving space between the front and rear seats of the vehicle, the inner and outer edges of the platform extending crosswise of the vehicle, and the ends of the platform extending lengthwise of the vehicle when the platform is horizontal.

I prefer to construct the platform from tubular bars including an inner bar 14 constituting the inner edge of the platform, or the edge adjacent to the front seat, an outer bar 15 parallel with the bar 14 and spaced therefrom, two outer end bars 16 connected by elbows 17 to the bar 14, and two inner end bars 18 connected with the bars 14 and 15, as best shown by Fig. 2. The bars 16 and 18 project outwardly from the bar 14, and the bars 18 are provided at their outer ends with bearings 20, for a purpose hereinafter stated.

The end bars 16 constitute slides adapted to move endwise in sleeves 21 which loosely embrace the end bars and are provided with trunnions or pintles 22 (Fig. 8) constituting members of platform hinges which permit the platform to swing on an axis transverse to the vehicle body and located between the inner and outer edges of the platform.

Said platform hinges include brackets having bases 23 adapted to be secured as hereinafter described, to the seat back 13, and elongated arms 24 constituting complemental members of the platform hinges and provided with sockets 25 (Fig. 8), in which the pintles 22 are adapted to turn. The said brackets are provided with fixed stops 26 which overhang portions of the inner edge of the platform and are spaced inwardly from the hinge members above described, the arrangement being such that when the platform is in a horizontal position, portions of its inner edge as shown the ends of the bars 16, 16, are held by the weight of the platform against the stops 26, so that the platform is maintained by the stops in a horizontal position, and the screen, which is connected as hereinafter described with the outer edge of the platform, is supported by the platform through the said bars and by the stops 26. The inner edge of the frame is adapted to swing downwardly away from the stops 26 to elevate the outer edge of the screen, so that the platform may be swung to a vertical position, as shown by full lines in Fig. 4. When the platform is vertical, or in a vertical plane, the end bars 16 are adapted to slide downwardly in the sleeves 21, as shown by Fig. 5, the platform being thus stored vertically in close proximity to the back of the front seat. When the platform is thus stored, the screen 12 is adapted by the connecting means hereinafter described, to stand vertically and substantially in alinement with the platform, as shown by Fig. 5, so that the screen is adapted to shield the occupants of intermediate displaceable seats between the fixed front and rear seats.

The sleeves 21 are provided with spring-pressed locking bolts 27 (Fig. 8), adapted to engage bolt holes 29 (Fig. 9) in the end bars 16 to lock said end bars to the sleeves.

The bases 23 of the brackets above described are preferably secured to the seat back 13 by means of bolts 28 passing through bolt holes in said bases and engaging internal threads in bushing 30 which pass through the outer portion of the seat back, and are provided with heads 31 bearing on the external surface of the seat back, and nuts 32 engaging external threads on the bushings and bearing on the inner surface of the seat back, as best shown by Figs. 2 and 3. The platform may be connected, therefore, quickly and conveniently with the seat back, no adaptation of the back or other part of the vehicle being necessary, other than the formation of holes for the bushings 30.

The connections between the screen and the outer edge of the platform are preferably provided by lock hinges, adapted to adjustably secure the screen to the platform in different positions. For example, the screen may be secured to the platform in an upstanding position, at right angles with the platform when the latter is horizontal, as shown by Figs. 1, 2 and 3. The screen when secured in this relative position, is thrown forward over the front seat when the platform is swung to a vertical position, as shown by full lines in Fig. 4. When the platform is stored, as shown by Fig. 5, the hinge connection between it and the screen permits the screen to stand vertically, as shown by full lines in Fig. 5. When the platform is in the last-mentioned position, the screen may be folded against the platform and stored behind the front seat, as shown by dotted lines in Fig. 4.

The preferred construction of the lock hinges is best shown by Figs. 6, 7, and 10, and includes supporting socket members 33 fixed to the outer ends of the end bars 16 of the platform and preferably formed integral with the bearings 20, a tubular pintle member 34 common to the two lock hinges, said pintle member being spaced from and parallel with the lower edge of the screen and journaled to turn in the socket members 33 and in the bearings 20, arms 35 fixed by set screws 36 to the pintle member 34 and provided with spring-pressed bolts 37, adapted to enter either one of an arcuate series of bolt holes 38 in flanges 33ª formed on the socket members 33, there being a plurality of concentrically arranged bolt holes, as indicated by Fig. 7, and brackets 39 attached to the frame of the screen and fixed as by set screws 40 to the pintle member 34, said brackets spacing the pintle member 34 from the screen frame. The bolt holes 38 and bolts 37 permit the screen to be secured to the platform in a position at right angles therewith, as shown by Figs. 3 and 4, and in a position substantially in alinement with the platform, as shown by Fig. 5.

The supporting members 33 fixed to the supporting means, constitute relatively fixed hinge members, while the brackets 39 fixed to the screen, and the bolt-carrying arms 35 fixed to the brackets by the pintle member 34, collectively constitute, in effect, swinging hinge members adapted to swing with the screen and pivotally connected with the relatively fixed supporting hinge member.

The supporting members having the arcuate series of bolt holes 38, and the spring-pressed bolts 37 adapted to automatically engage said bolt holes, constitute clutches adapted to automatically lock the screen in different angular positions.

The slidable connection between the end bars 16 and the sleeves 21 permits the platform to slide outwardly from under the stops 26 until the platform is no longer in coöperative relation with said stops. When the platform is thus adjusted, it may be operatively supported in a horizontal position by arms 42, which are slidable in the pintle member 34, the latter being tubular. Said arms are adapted to be moved outwardly, as indicated by dotted lines in Fig. 1, and bear on portions 43 of the vehicle body, these portions being, for example, the sides of the body behind the doors between the front and rear seats.

The bolts 27 which engage the sleeves 21 with the frame end bars 16 may be simultaneously retracted by means embodied in a transverse pull cord 44 connected with the bolts 27, and a longitudinal pull cord 45 connected with the cord 44 and extending to the outer edge portion of the platform. The lock hinge bolts 37 may be simultaneously retracted by a pull cord 46 connected with the said bolts and with the longitudinal cord 45. The cord 44 may be engaged with guides 47 attached to the platform bars 18, and the cord 46 may be engaged with guides 49 attached to the pintle member 34. When a pull is exerted on the middle portion of the cord 46, the bolts 37 and 27 are simultaneously retracted.

The screen 12 may be provided with wings 12ª (Figs. 1 and 2) connected by hinges 50 with the end portions of the screen 12, said hinges being adapted to be loosened to permit the wings to be adjusted relatively to the screen 12, and tightened to maintain any desired adjustment.

The described platform is adapted to support the flexible wind-supporting diaphragm disclosed by my Patent No. 1,285,626, dated November 26, 1918.

*Operation.*

When the windshield is adjusted, as shown by Figs. 1, 2 and 3, the screen is adapted to protect the occupants of the rear seat, the screen being secured by the lock hinges substantially at right angles with the platform, and the platform being maintained in a horizontal position by the stops 26. The platform and screen may be displaced, as shown by Fig. 4, to permit passengers to enter and leave the vehicle, the screen temporarily projecting over the front seat.

The windshield may be adjusted to protect the occupants of intermediate seats by shifting the platform to the position shown by Fig. 5, and locking the screen by means of the lock hinges substantially in alinement with the platform. When the use of the windshield is not required, the screen is folded against the platform and both are stored behind the front seat, as shown by dotted lines in Fig. 4.

In case it is desirable to locate the screen at a minimum distance from the occupants of the rear seat, the platform is moved rearwardly in the sleeves 21 as far as said sleeves will permit, thus removing the inner edge of the platform from under the stops 26, and the arms 42 are extended to bear on the portions 43 of the vehicle body, and maintain the platform in a horizontal position.

I claim:

1. In a wind-shield, the combination of a screen, supporting bars therefor, means for connecting the supporting bars and the screen, means for slidably and pivotally mounting the bars at points intermediate their ends whereby the bars are capable of longitudinal adjustment in the plane thereof and of pivotal movement about longitudinal axes selected with respect to their length, and coöperating means between the bars and the second said means whereby the bars may be maintained in a predetermined position with respect to their pivotal and longitudinal adjustment.

2. In a wind-shield, the combination of a screen-supporting platform, means for slidably and pivotally mounting the platform at a point intermediate opposite edges whereby the platform is capable of longitudinal adjustment in its own plane, and of pivotal movement about longitudinal axes selected with respect to its length, and coöperating means between the platform and the first said means whereby the platform may be maintained in a predetermined position with respect to its pivotal and longitudinal adjustment.

3. In a wind-shield, the combination of a screen-supporting platform, means for slidably and pivotally mounting the platform at a point intermediate opposite edges whereby the platform is capable of bodily longitudinal movement in its own plane and of pivotal movement about axes selected with respect to its length, coöperating means between the platform and the first said means whereby the platform may be maintained in a predetermined position with respect to its pivotal adjustment, and coöperating means between the platform and the first said means whereby the platform may be maintained at predetermined points with respect to its longitudinal adjustment.

4. In a wind-shield, the combination of a screen-supporting platform, means for slidably and pivotally mounting the platform at a point intermediate opposite edges, whereby the platform is capable of bodily longitudinal adjustment in its own plane, and of pivotal movement about axes selected with respect to its length, coöperating means between the platform and the first said means, whereby the platform may be maintained in a predetermined position with respect to its pivotal and longitudinal adjustment, a screen, coöperating means between the platform and screen for pivotally connecting the screen to the platform, whereby said screen may be adjusted to various angular positions with respect to the platform, and coöperating means between the platform and last said means whereby the screen may be held at predetermined angular positions with respect to the platform.

5. In a wind-shield, the combination of a screen-supporting platform, means for slidably and pivotally mounting the platform whereby the platform is capable of bodily longitudinal movement in its own plane, and of pivotal movement about axes selected with respect to its length, and coöperating means between the platform and the first said means for holding the platform against pivotal movement in one direction when the platform is in a predetermined position with respect to its longitudinal adjustment, and for allowing pivotal movement of the platform in an opposite direction when the platform is in said predetermined position.

6. In a wind-shield, the combination of a screen-supporting platform, means for mounting the platform whereby it may be adjusted to various positions, a screen, coöperating means between the platform and screen for supporting the screen in adjustable position on the platform, clutch means between the platform and the said mounting means, whereby the platform may be maintained in adjusted position, a second clutch means between the platform and the said coöperating means, whereby the screen may be maintained in adjusted position with respect to the platform, and means whereby the first said clutch means and the said second clutch means may be simultaneously and individually actuated.

7. A windshield comprising a screen-supporting platform formed to project over the leg-receiving space between the front and rear seats of a motor vehicle, the inner and outer edges of the platform extending crosswise of the vehicle, hinge members on the ends of the platform between the inner and outer edges thereof, brackets attachable to a portion of a vehicle body in front of a seat thereof, and having complemental hinge members engaged with the hinge members on the platform, the hinges formed by said members permitting the platform to swing on a transverse axis between the inner and outer edges, the inner edge moving upward when the outer edge is moving downward, said brackets and the inner edge portion of the platform being adapted to coöperate in supporting the platform in a substantially horizontal position, supporting members fixed to opposite ends of the platform, a screen, arms rigidly connected with the inner edge of the screen at opposite end portions thereof, hinge connections between said arms and supporting members permitting the screen to swing on an axis transverse to the vehicle, each supporting member being provided with an arcuate series of bolt holes concentric with said axis, and spring-pressed bolts carried by said arms and adapted to automatically engage said bolt holes, said supporting members and bolts constituting clutches adapted to automatically lock the screen to the frame in different angular positions.

8. A windshield comprising a screen-supporting platform formed to occupy a substantially horizontal position over the leg-receiving space between the front and rear seats of a motor vehicle, the inner and outer edges of said platform extending crosswise of the vehicle, the platform ends being composed of end bars constituing slides, sleeves embracing said end bars and permitting sliding movements thereof, hinge members on said sleeves, brackets adapted for attachment to a front seat back and formed to project rearwardly therefrom, said brackets having hinge members complemental to the hinge members on said sleeves, the platform hinges formed by said members permitting the platform to swing on an axis between its inner and outer edges, stops adapted to normally maintain the platform in a horizontal position, a screen, and lock hinges connecting the screen with the outer edge of the platform, whereby the screen may be either secured in an upstanding position to the platform, or in a position substantially in alinement with the platform, or folded against the latter, said platform hinges permitting the platform and screen to be swung upward and forward from their operative position, and stand in a vertical plane, and said sleeves permitting the platform to slide downwardly when in a vertical plane to store the platform vertically behind the front seat, means being provided for locking the said frame end bars to the sleeves to prevent a sliding movement of the platform.

9. A windshield comprising a screen-supporting platform formed to occupy a substantially horizontal position over the leg-receiving space between the front and rear seats of a motor vehicle, the inner and outer edges of said platform extending crosswise of the vehicle, the platform ends being composed of end bars constituting slides, and each provided with a plurality of bolt-securing sockets, sleeves embracing said end bars and permitting sliding movements thereof, said sleeve being provided with hinge members and with spring-pressed locking bolts adapted to engage said sockets and hold the end bars and platform at different adjustments, means for simultaneously retracting said bolts to permit sliding movements of the platform, brackets adapted for attachment to a front seat back and formed to project rearwardly therefrom, said brackets having hinge members complemental to the hinge members on said sleeves, stops adapted to maintain the platform in a horizontal position, a screen, and connections between the screen and the outer edge of the platform, the platform and screen being adjustable by movements of the end bars in the sleeves, and said locking bolts and sockets permitting the platform to be secured to the sleeves at various adjustments.

10. A windshield comprising a screen-supporting platform formed to occupy a substantially horizontal position over the leg-receiving space between the front and rear seats of a motor vehicle, the inner and outer edges of the platform extending crosswise of the vehicle, hinge members engaged with the ends of the platform and spaced from the inner edge thereof, complemental hinge members attachable to a portion of the vehicle body in front of a seat thereof, the hinges formed by said members permitting the platform to swing on an axis transverse to the vehicle and spaced from the inner edge of the platform, stops adapted to maintain the platform in a horizontal position, a screen, connections between the screen and the outer edge of the platform, adapted to maintain the screen in a fixed position relatively to the platform, the said stops being adapted to coöperate with the inner edge of the platform in operatively supporting the platform and screen, and to permit the outer edge portion of the platform to be swung upwardly, the platform including end bars slidably engaged with the hinge members on the ends of the platform, whereby the platform may be moved out of coöperative relation with said stops, and arms slidably engaged with the outer edge portion of the platform and adapted to be adjusted to project from opposite ends of the platform and bear on portions of the vehicle body to maintain the platform in a horizontal position.

In testimony whereof I have affixed my signature.

HARRISON W. CONNER.